United States Patent
Ma et al.

(10) Patent No.: US 11,514,330 B2
(45) Date of Patent: Nov. 29, 2022

(54) SYSTEMS AND METHODS FOR CONTINUAL UPDATING OF RESPONSE GENERATION BY AN ARTIFICIAL INTELLIGENCE CHATBOT

(71) Applicant: Cambia Health Solutions, Inc., Portland, OR (US)

(72) Inventors: Weicheng Ma, Brooklyn, NY (US); Kai Cao, Seattle, WA (US); Bei Pan, Kirkland, WA (US); Lin Chen, Bellevue, WA (US); Xiang Li, Bellevue, WA (US)

(73) Assignee: Cambia Health Solutions, Inc., Portland, OR (US)

( * ) Notice: Subject to any disclaimer, the term of this patent is extended or adjusted under 35 U.S.C. 154(b) by 506 days.

(21) Appl. No.: 16/741,613

(22) Filed: Jan. 13, 2020

(65) Prior Publication Data
US 2020/0226475 A1  Jul. 16, 2020

Related U.S. Application Data

(60) Provisional application No. 62/792,355, filed on Jan. 14, 2019.

(51) Int. Cl.
| | |
|---|---|
| *G06N 3/08* | (2006.01) |
| *H04L 51/02* | (2022.01) |
| *G06F 40/30* | (2020.01) |
| *G06N 3/04* | (2006.01) |
| *H04L 67/01* | (2022.01) |

(52) U.S. Cl.
CPC ............ *G06N 3/088* (2013.01); *G06F 40/30* (2020.01); *G06N 3/0454* (2013.01); *G06N 3/084* (2013.01); *H04L 51/02* (2013.01); *G06N 3/04* (2013.01); *G06N 3/0445* (2013.01); *H04L 67/01* (2022.05)

(58) Field of Classification Search
CPC ...... G06N 3/088; G06N 3/0454; G06N 3/084; G06N 3/04; G06N 3/0445; G06N 3/006; G06N 3/0472; G06F 40/30; G06F 40/35; H04L 51/02; H04L 67/01; G06K 9/6256; H04N 19/147
See application file for complete search history.

(56) References Cited

U.S. PATENT DOCUMENTS

| | | | | |
|---|---|---|---|---|
| 10,891,673 | B1 * | 1/2021 | Sawaf | G06Q 30/0643 |
| 2019/0095798 | A1 * | 3/2019 | Baker | G06N 3/063 |
| 2019/0130278 | A1 * | 5/2019 | Karras | G06N 3/0472 |
| 2019/0279075 | A1 * | 9/2019 | Liu | G06N 3/0472 |

(Continued)

OTHER PUBLICATIONS

Pu, Y. et al., "Variational Autoencoder for Deep Learning of Images, Labels and Captions," Cornell University arXiv Website, Available Online at https://arxiv.org/abs/1609.08976, Available as Early as Sep. 28, 2016, 13 pages.

*Primary Examiner* — Michael Colucci
(74) *Attorney, Agent, or Firm* — McCoy Russell LLP

(57) ABSTRACT

Methods and systems are provided for a natural language processing system comprising a chatbot adapted for dialog generation. In one example, the system may include a combination of a variational autoencoder (VAE) and a generative adversarial network (GAN) for generating natural responses to input queries. The VAE may convert queries into vector embeddings that may then be used by the GAN to continuously update and improve responses provided by the chatbot.

20 Claims, 7 Drawing Sheets

(56) References Cited

U.S. PATENT DOCUMENTS

| | | | |
|---|---|---|---|
| 2019/0287217 A1* | 9/2019 | Cooke | G06N 3/0472 |
| 2019/0287301 A1* | 9/2019 | Colbert | G06K 9/6256 |
| 2020/0012892 A1* | 1/2020 | Goodsitt | G06F 9/54 |
| 2020/0041276 A1* | 2/2020 | Chakravarty | G06N 3/088 |
| 2020/0187841 A1* | 6/2020 | Ayyad | A61B 5/377 |
| 2020/0242736 A1* | 7/2020 | Liu | G06T 11/60 |
| 2020/0242774 A1* | 7/2020 | Park | G06T 11/001 |
| 2020/0244969 A1* | 7/2020 | Bhorkar | H04N 19/147 |
| 2020/0273081 A1* | 8/2020 | Greenwald | G06Q 30/0631 |
| 2020/0286256 A1* | 9/2020 | Houts | G06T 5/001 |

* cited by examiner

SYSTEMS AND METHODS FOR CONTINUAL UPDATING OF RESPONSE GENERATION BY AN ARTIFICIAL INTELLIGENCE CHATBOT

CROSS-REFERENCE TO RELATED APPLICATIONS

The present application claims priority to U.S. Provisional Application No. 62/792,355, entitled "Systems and Method for Continual Updating of Response Generation by and Artificial Intelligence Chatbot", and filed on Jan. 14, 2019. The entire contents of the above-listed application are hereby incorporated by reference for all purposes.

BACKGROUND AND SUMMARY

The use of Artificial Intelligence (AI) chatbots in place of human correspondence is an increasingly popular option to reduce costs and improve efficiency in addressing customer queries and interactions. For busy medical clinics, hospitals, and customer-based organizations, clients may often prefer to consult an AI-based dialog system, e.g., a chatbot, for answering common questions or obtaining general information rather than travelling to the location, waiting in lines, or being placed on hold during telephone calls. By speaking or entering a text into the chatbot, clients may receive useful answers within a greatly reduced time period compared to direct communication with personnel. Thus the chatbot is a user-friendly contact option for clients of a clinic, business, or institution, providing clients with answers to general queries in a timely, efficient manner. In recent years, the chatbot has become an efficient interactive tool and method to provide services to clients. The chatbot is a computer program responsible for responding to input queries in an appropriate, natural, and meaningful manner is and may use a natural language processing (NLP) system to simulate human behavior. One task of the NLP system is to generate natural responses to input queries using Natural Language Generation (NLG), herein referred to as dialog generation (DG).

For example, if a user enters "How are you today?" into a dialog box of a chatbot, the NLG supported chatbot may reply with a human-like answer such as "Very well thanks. How are you?" By providing the user with relevant, useful responses through the chatbot, customer support efficiency is increased while employees may devote more time to performing tasks not involving direct communication with clients.

Dialog generation (DG) is a core component of AI chatbot systems. Unlike conventional natural language generation models, the dialog generator is programmed to comprehend sentences and form responses based on the sentences. Thus dialog generators are more complex than traditional natural language generation models, where traditional natural language generation models create responses through direct selection from a knowledge base or with help from syntactic analysis.

For example, traditional DG methods in chatbots include rule-based and grammar-based systems. In such approaches, responses are selected from a finite set of predefined sentences or patterns based on similarity to queries stored in the knowledge base. The knowledge base comprises a list of rules and an inference engine may perform a match-resolve-act cycle. The rule-based and grammar-based DG systems may generate syntactically perfect sentences and perform well under narrow constraints.

However, the inventors herein have recognized potential issues with such systems. As one example, the generalizability of the rule-based mechanism is poor and the ability to answer new questions and understand queries from new domains may be limited. As a result, responses to queries that do not adequately match the predefined sentences or patterns in the knowledge base may be unsatisfactory to the user. In addition, grammar-based approaches show difficulty in interpreting spoken language.

In one example, the issues described above may be addressed by a deep learning-based NLG technique comprising a neural network-based method for dialog generation in a chatbot. Word embeddings learned from a large-scale corpus and state-of-the-art sequence-to-sequence (Seq2Seq) modeling are leveraged to generate responses to user queries. The neural network provides a machine learning model that may be trained with a large dataset of language-based queries. This allows the chatbot to handle different types of inputs, which are processed by a system including two components: a variational autoencoder (VAE) and a generative adversarial network (GAN). The VAE can encode and decode input in a prediction modeling which is trained by the GAN, an unsupervised generative model, by minimizing the distance between the input query and a predicted response. In this way, the VAE and the GAN may be used in combination to generate improved responses in a supervised learning manner. Furthermore, the combined VAE and GAN may be adapted to a Seq2Seq model dialog generator to improve syntactical or semantical completeness of responses.

As one example, the VAE may embed word semantics into vector representations from a large-scale dataset so that input queries may be modeled towards appropriate responses. The input is encoded and decoded into a prediction model which is trained by minimizing the distance between the input query and the predicted response. The GAN is an unsupervised generative model with a training process accomplished through competition between a generator and a discriminator. Both the VAE and GAN have been used for generating images and independently applied to dialog generation but have not been jointly used for dialog generation. Thus combining the GAN with the VAE as a neural network solution to dialog generation may produce more natural and engaging responses to spoken and typed input queries.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 2:
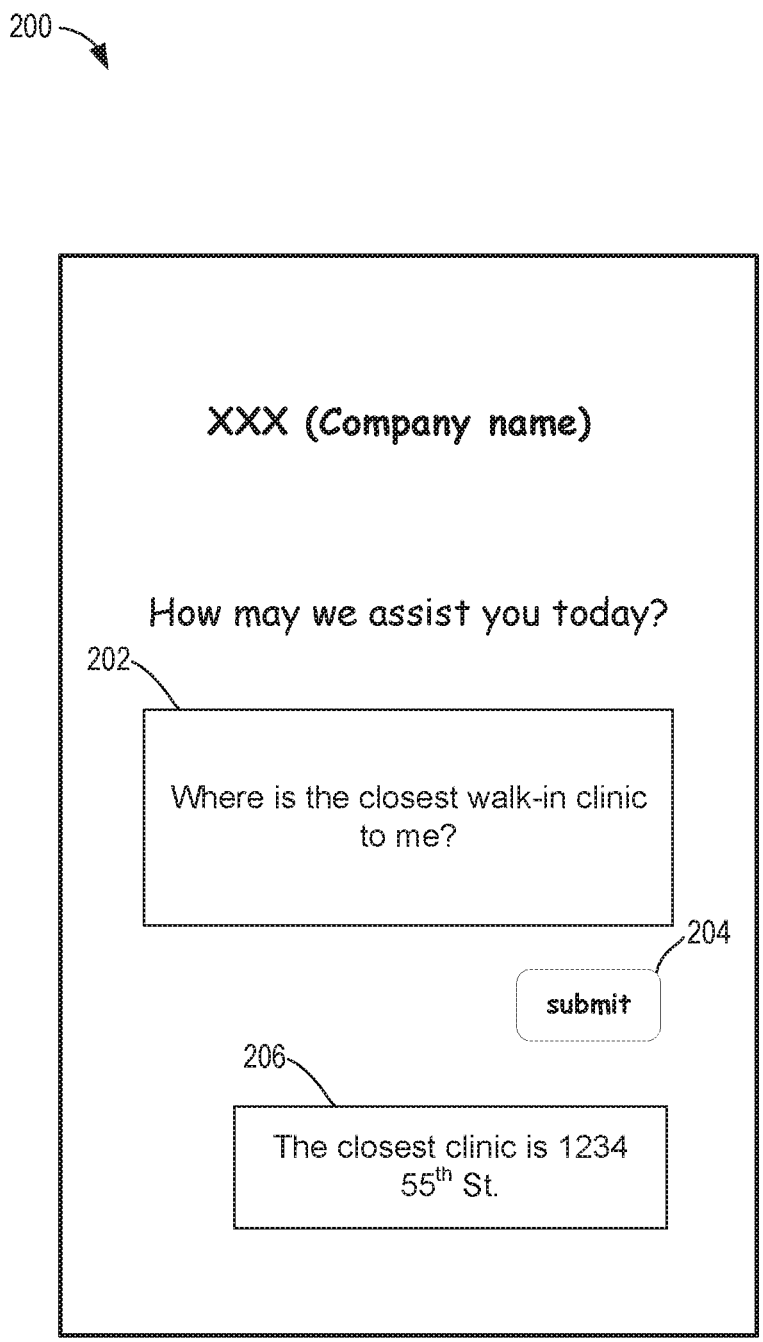
FIG. 2 shows an example user interface on a customer device.
Figure 3:
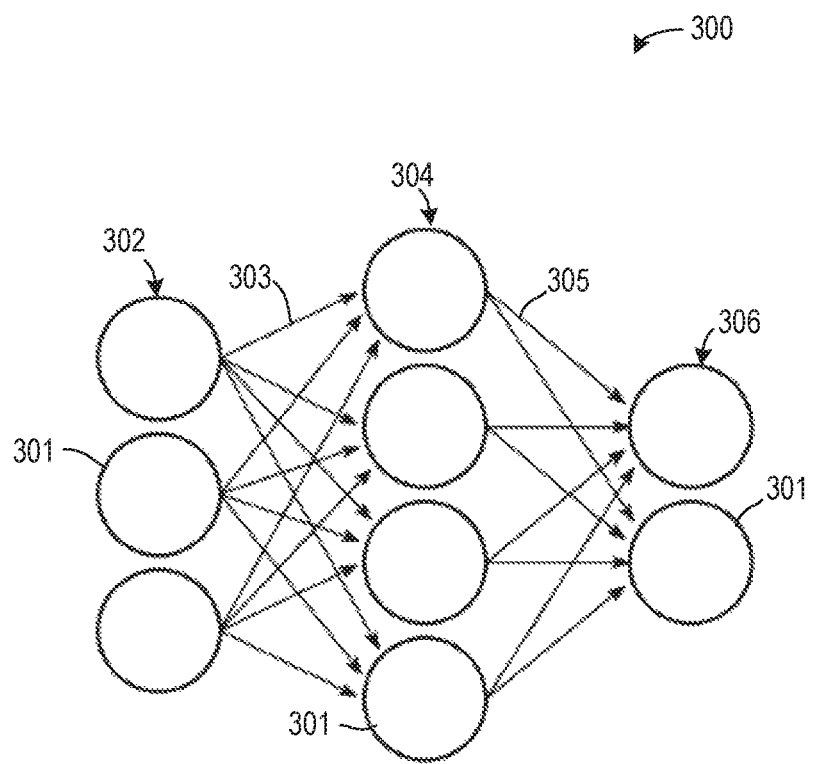
FIG. 3 shows a schematic diagram of an embodiment of a neural network.
Figure 4:
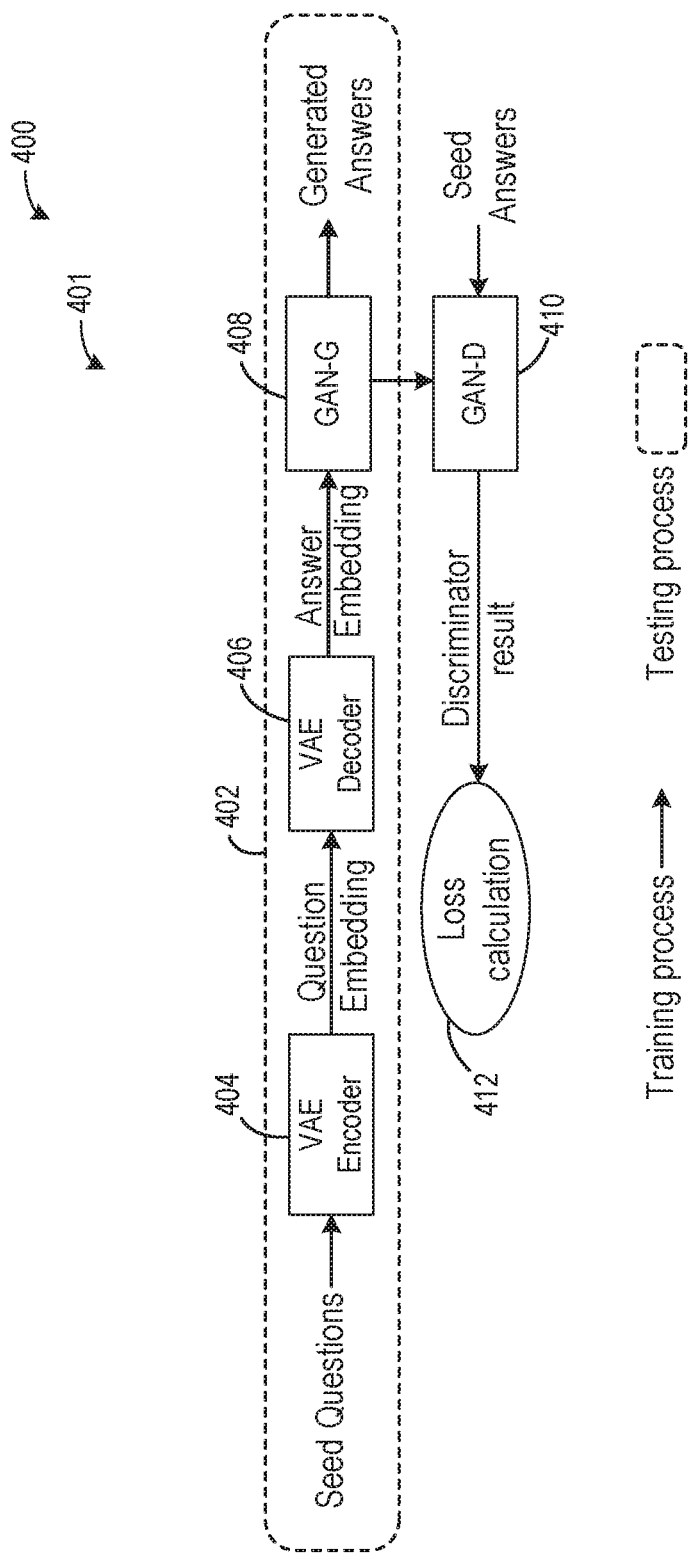
FIG. 4 shows a framework architecture of a dialog generation system.

The present description relates to systems and methods for dialog generation in chatbots. In particular, systems and methods are provided for automatically generating natural, human-like responses to an input query. A neural network-based solution for dialog generation may be implemented on a computing system and network, such as the system depicted in FIG. 1. A system including a user interface, such as a computer, smart phone, tablet, etc., may allow a user to communicate with an artificial intelligence (AI) dialog generator, or chatbot, by entering query texts, as shown in FIG. 2, at the user interface. The neural network used for dialog generation may include a large plurality of neurons or nodes, arranged into layers including one or more input layers, one or more output layers, as well as one or more hidden layers, as depicted in FIG. 3. The neural network is trained by seed questions from a human-generated corpus not acquired from the chatbot. In some examples, the neural network may be configured with a variational autoencoder (VAE) component and a generative adversarial network (GAN) component. The VAE may convert queries received by the chatbot to vectors that are then used by the neural network to generate a response. The responses generated by the neural network are sent to the GAN where a competitive process evaluates a difference between the generated answer and a seed answer. The difference is used to train the neural network. The dialog generator is thus continually updated to provide progressively more useful response to input queries through interaction with users via the chatbot. A system architecture of a dialog generator using a Seq2Seq model adapted with variational layers (of VAE) and the training process (of GAN) is shown in FIG. 4. Scores obtained from testing the dialog generator by two evaluation metrics: Bilingual Evaluation Understudy (BLEU) and Recall-Oriented Understudy for Gisting Evaluation (ROUGE), to compare results from using different combinations of neural network architectures are listed in FIG. 5. Outputs generated by the different combinations of neural network architectures and compared to a traditional rule-based system are shown in FIG. 6. The outputs are generated in response to input queries that are representative of natural syntax and sentence structure, providing a comparison of the ability of each combination to simulate natural replies. A method for a testing process of the framework architecture of the dialog generator, such as the method depicted in FIG. 7, may provide answers to input queries in conjunction with a training process. A method for the training process to train the dialog generator, such as the method depicted in FIG. 8, may continuously improve responses from the dialog generator.

Dialog generation is a core aspect of chatbot systems. Ideally, the dialog generator is able to understand queries and generate responsive sentences. Traditional dialog generators form responses based on direct selection from a knowledge base or with assistance from syntactic analysis (e.g., rule- or grammar-based). While syntactically well-structured answers may be provided, the rule- and grammar-based systems may not be effective when extended to natural language, e.g., language spoken or written by a person due to a tendency for natural language to deviate from grammatical restrictions.

To address this issue, neural network (NN) solutions may be adapted to the task of dialog generation. In NN dialog generators, an encoder-decoder structure is applied, where an encoder abstracts the query into an embedding and a decoder recursively forms word embeddings from the encoded sentence embedding. Often, a sequence-to-sequence (Seq2Seq) model is used as a flexible approach that generates higher-quality responses than rule or grammar-based systems but may suffer from low syntactical or semantical completeness or return embeddings that are distant from any word vector in the model. This may arise from a lack of variation in the generated sentence embeddings when the query is longer.

By importing variational layers from a variational autoencoder (VAE) and adding a training process of generative adversarial network (GAN) to the Seq2Seq model, sentence abstraction may become more sensitive to the actual sentence meaning. A resulting dialog generation system architecture is a Variational-Seq2Seq dialog generator (VSDG). The VSDG may be continually trained to provide increasingly appropriate responses to user questions via incorporation of a deep neural network in the system architecture. This allows updates to the VSDG to be made by adjusting algorithms configured for training of the neural network. In contrast, in order for a rule-based system to expand its ability to respond to new queries, the volume and variety of data may become large enough to clutter and hinder an operational system of a computing device.

The VSDG may utilize more computing power than the rule-based system to accommodate addition of variational layers. However, the demand for higher computing power may be offset by a greater likelihood that the VSDG generates suitable answers to queries as well as a higher capacity of the VSDG to handle a broader conversational scope than the rule-based system. Thus, the VSDG may be associated with less frequent demands for updating a software of the VSDG. A validity of generated responses by the VSDG may be maintained useful for a prolonged period of time due to a self-updating capacity of the VSDG. Furthermore, an ability of the VSDG to provide progressively more suitable responses to a variety of queries may maintain an amount of data stored in a computing system significantly smaller than an amount demanded by the rule-based system. A dependency of the VSDG on retrieving stored data is comparatively low. Elaboration on the elements of the VSDG and principles of calculation is provided herein in the following figure descriptions.

Figure 1:
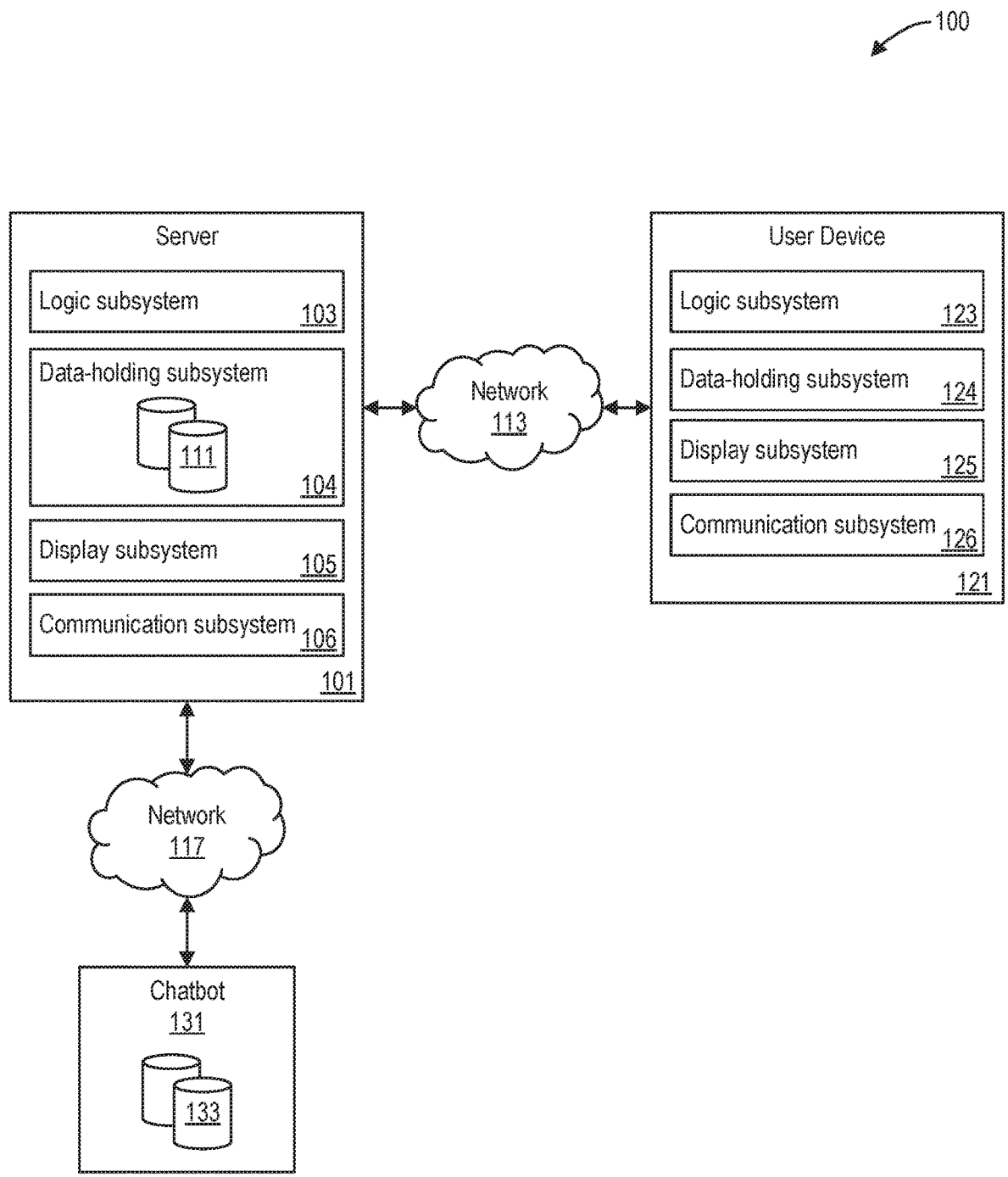
FIG. 1 shows a block schematic diagram of an example computing system and network for dialog generation.

FIG. 1 illustrates an example computing environment 100 in accordance with the current disclosure. In particular, computing environment 100 includes a server 101, a user device 121, a chatbot server 131, and networks 113 and 117. However, not all of the components illustrated may be required to practice the invention. Variations in the arrangement and type of the components may be made without departing from the spirit or scope of the invention.

As an example, server 101 may be a computing device configured to calculate health care treatment costs from claims data. In different embodiments, server 101 may take the form of a mainframe computer, server computer, desktop computer, laptop computer, tablet computer, home entertainment computer, network computing device, mobile computing device, mobile communication device, gaming device, etc.

Server 101 includes a logic subsystem 103 and a data-holding subsystem 104. Server 101 may optionally include a display subsystem 105, communication subsystem 106, and/or other components not shown in FIG. 1. For example, server 101 may also optionally include user input devices such as keyboards, mice, game controllers, cameras, microphones, and/or touch screens.

Logic subsystem 103 may include one or more physical devices configured to execute one or more instructions. For example, logic subsystem 103 may be configured to execute one or more instructions that are part of one or more applications, services, programs, routines, libraries, objects, components, data structures, or other logical constructs. Such instructions may be implemented to perform a task, implement a data type, transform the state of one or more devices, or otherwise arrive at a desired result.

Logic subsystem 103 may include one or more processors that are configured to execute software instructions. Additionally or alternatively, the logic subsystem 103 may include one or more hardware or firmware logic machines configured to execute hardware or firmware instructions. Processors of the logic subsystem 103 may be single or multi-core, and the programs executed thereon may be configured for parallel or distributed processing. The logic subsystem 103 may optionally include individual components that are distributed throughout two or more devices, which may be remotely located and/or configured for coordinated processing. One or more aspects of the logic subsystem 103 may be virtualized and executed by remotely accessible networked computing devices configured in a cloud computing configuration.

Data-holding subsystem 104 may include one or more physical, non-transitory devices configured to hold data and/or instructions executable by the logic subsystem 103 to implement the herein described methods and processes. When such methods and processes are implemented, the state of data-holding subsystem 104 may be transformed (for example, to hold different data).

Data-holding subsystem 104 may include removable media and/or built-in devices. Data-holding subsystem 104 may include optical memory (for example, CD, DVD, HD-DVD, Blu-Ray Disc, etc.), and/or magnetic memory devices (for example, hard drive disk, floppy disk drive, tape drive, MRAM, etc.), and the like. Data-holding subsystem 104 may include devices with one or more of the following characteristics: volatile, nonvolatile, dynamic, static, read/write, read-only, random access, sequential access, location addressable, file addressable, and content addressable. In some embodiments, logic subsystem 103 and data-holding subsystem 104 may be integrated into one or more common devices, such as an application-specific integrated circuit or a system on a chip.

It is to be appreciated that data-holding subsystem 104 includes one or more physical, non-transitory devices. In contrast, in some embodiments aspects of the instructions described herein may be propagated in a transitory fashion by a pure signal (for example, an electromagnetic signal) that is not held by a physical device for at least a finite duration. Furthermore, data and/or other forms of information pertaining to the present disclosure may be propagated by a pure signal.

When included, display subsystem 105 may be used to present a visual representation of data held by data-holding subsystem 104. As the herein described methods and processes change the data held by the data-holding subsystem 104, and thus transform the state of the data-holding subsystem 104, the state of display subsystem 105 may likewise be transformed to visually represent changes in the underlying data. Display subsystem 105 may include one or more display devices utilizing virtually any type of technology. Such display devices may be combined with logic subsystem 103 and/or data-holding subsystem 104 in a shared enclosure, or such display devices may be peripheral display devices.

When included, communication subsystem 106 may be configured to communicatively couple server 101 with one or more other computing devices, such as user device 121 and/or chatbot server 131. Communication subsystem 106 may include wired and/or wireless communication devices compatible with one or more different communication protocols. As non-limiting examples, communication subsystem 106 may be configured for communication via a wireless telephone network, a wireless local area network, a wired local area network, a wireless wide area network, a wired wide area network, etc. In some embodiments, communication subsystem 106 may allow server 101 to send and/or receive messages to and/or from other devices via a network such as the public Internet. For example, communication subsystem 106 may communicatively couple server 101 with user device 121 via network 113 and/or chatbot server 131 via network 117. In some examples, network 113 may be the public Internet. Furthermore, network 117 may be regarded as a private network connection and may include, for example, a virtual private network or an encryption or other security mechanism employed over the public Internet. In some examples, network 113 and network 117 may be the same network.

Computing environment 100 may include one or more devices operated by users, such as user device 121. User device 121 may be any computing device configured to access a network such as network 113, including but not limited to a personal computer, a laptop, a smartphone, a tablet, and the like.

User device 121 includes a logic subsystem 123 and a data-holding subsystem 124. User device 121 may optionally include a display subsystem 125, communication subsystem 126, and/or other components not shown in FIG. 1. For example, user device 121 may also optionally include user input devices such as keyboards, mice, game controllers, cameras, microphones, and/or touch screens.

Logic subsystem 123 may include one or more physical devices configured to execute one or more instructions. For example, logic subsystem 123 may be configured to execute one or more instructions that are part of one or more applications, services, programs, routines, libraries, objects, components, data structures, or other logical constructs. Such instructions may be implemented to perform a task, implement a data type, transform the state of one or more devices, or otherwise arrive at a desired result.

Logic subsystem 123 may include one or more processors that are configured to execute software instructions. Additionally or alternatively, the logic subsystem 123 may include one or more hardware or firmware logic machines configured to execute hardware or firmware instructions. Processors of the logic subsystem 123 may be single or multi-core, and the programs executed thereon may be configured for parallel or distributed processing. The logic subsystem 123 may optionally include individual components that are distributed throughout two or more devices, which may be remotely located and/or configured for coordinated processing. One or more aspects of the logic subsystem 123 may be virtualized and executed by remotely accessible networking computing devices configured in a cloud computing configuration.

Data-holding subsystem 124 may include one or more physical, non-transitory devices configured to hold data and/or instructions executable by the logic subsystem 123 to implement the herein described methods and processes. When such methods and processes are implemented, the state of data-holding subsystem 124 may be transformed (for example, to hold different data).

Data-holding subsystem 124 may include removable media and/or built-in devices. Data-holding subsystem 124 may include optical memory (for example, CD, DVD, HD-DVD, Blu-Ray Disc, etc.), and/or magnetic memory devices (for example, hard drive disk, floppy disk drive, tape drive, MRAM, etc.), and the like. Data-holding subsystem 124 may include devices with one or more of the following characteristics: volatile, nonvolatile, dynamic, static, read/write, read-only, random access, sequential access, location addressable, file addressable, and content addressable. In some embodiments, logic subsystem 123 and data-holding subsystem 124 may be integrated into one or more common devices, such as an application-specific integrated circuit or a system on a chip.

When included, display subsystem 125 may be used to present a visual representation of data held by data-holding subsystem 124. As the herein described methods and processes change the data held by the data-holding subsystem 124, and thus transform the state of the data-holding subsystem 124, the state of display subsystem 125 may likewise be transformed to visually represent changes in the underlying data. Display subsystem 125 may include one or more display devices utilizing virtually any type of technology. Such display devices may be combined with logic subsystem 123 and/or data-holding subsystem 124 in a shared enclosure, or such display devices may be peripheral display devices.

When included, communication subsystem 126 may be configured to communicatively couple user device 121 with one or more other computing devices, such as server 101. Communication subsystem 126 may include wired and/or wireless communication devices compatible with one or more different communication protocols. As non-limiting examples, communication subsystem 126 may be configured for communication via a wireless telephone network, a wireless local area network, a wired local area network, a wireless wide area network, a wired wide area network, etc. In some embodiments, communication subsystem 126 may allow user device 101 to send and/or receive messages to and/or from other devices, such as server 101, via a network 113 such as the public Internet.

Similarly, chatbot server 131 may comprise a computing device communicatively coupled to server 101 via network 117. In some examples, chatbot server 131 may include one or more databases 133 that contains a knowledge base, where the knowledge base may include algorithms for embedding word semantics into vector representations and training a neural network, such as the neural network 300 of FIG. 3.

Thus server 101, user device 121, and chatbot server 131 may each represent computing devices which may generally include any device that is configured to perform computation and that is capable of sending and receiving data communications by way of one or more wired and/or wireless communication interfaces. Such devices may be configured to communicate using any of a variety of network protocols. For example, user device 121 may be configured to execute a browser application that employs HTTP to request information from server 101 and then displays the retrieved information to a user on a display.

Example interfaces that may be delivered to user device 121 from server 101 in such a manner and displayed, for example, on display subsystem 125 are described further herein and with regard to FIG. 2.

Server 101 may collect and process data from chatbot server 131. Server 101 may analyze the collected data using, for example, data analysis techniques and/or artificial intelligence techniques. For example, word semantics collected from chatbot server 131 may be processed and matched with vectors in the knowledge base. Server 101 may include one or more databases 111 in data-holding subsystem 104 for storing processed claims data. Systems and methods for embedding word semantics into vector representations that are modeled to provide responses to input queries are described further herein with regard to FIGS. 2-8.

The computing environment 100 of FIG. 1 may be configured with a deep learning system for generating human-like response to input text queries. The deep learning system may be a Variational Seq2Seq Dialog Generator (VSDG). In some embodiments, the deep learning system may be implemented on the server 101, or in the chatbot server 131, or implemented remotely for example in a cloud in communication with computing environment 100.

In order for the VSDG to form answers to a user input, a user interface may be provided on a user device as part of a display subsystem, such as the display subsystem 125 of user device 121 of FIG. 1. An example of a user interface 200 is shown in FIG. 2. The user interface 200 may be displayed on a client device such as a computer, smart phone, or tablet. A text box 202 of a chatbot may be presented where a query text may be entered by a user by typing on a keyboard or speaking into a microphone if the device is adapted with voice recognition capabilities. The query may be entered using natural language in the same manner that the client would pose a question to a person. The user may submit the request using a button, such as button 204.

After the query is submitted, the request may be processed automatically by the chatbot to form an answer. The response is displayed in a response dialog box 206 below the query text box 202. The example of FIG. 2 shows a reply that provides an answer directly correlated to the entry question. Alternatively, if the response does not satisfy the user's question, as determined by the chatbot by continued queries from the user, the chatbot may continue attempting to match the query to data from a VAE model of the VSDG and send further responses to the user interface 200. When a response is found acceptable by the user, as detected by a user entry such as "Ok, thank you", or "Yes, that's what I need", a GAN of the VSDG may then train the VAE to use the response determined to be appropriate for future responses to the same or similar queries.

In one example, the VSDG may be used to interact with users in a conversational style via a website for a health provider. The user may type in queries in a question format in the query text box 202 to obtain general information about the health provider. The user may search for nearby clinics or determine whether a clinic is within the user's health insurance network, determine hours of opening, etc. The chatbot may refer to a database providing general information about the health provider and use the VSDG to train the chatbot to recognize questions and learn from previous interactions to provide responses in as few iterations as possible.

As another example, the VSDG may be used to provide responses through the chatbot to direct a user to a suitable health care department or health care specialist. In response to an entry query from the user seeking information to direct the user to a desired website link or to contact information for the department or specialist, the chatbot may respond with questions that progressively focus the responses towards a final answer that satisfies the user's search. The results from the interaction may be used towards future queries with similar prompts, such as key words or key phrases.

For example, the chatbot may supply the user with information via a dialog that directs the chatbot to provide a correct or most useful answer. As an example, the user may be seeking a suitable provider for a specific set of symptoms. The user may enter a request to find a provider into the dialog box of the chatbot. The chatbot may use the listed symptoms to direct the user to a website (e.g., provide a website link) to a provider matching the symptoms or provide a name, phone number, and/or an address for the provider. If the chatbot is unable to identify a suitable provider based on the set of symptoms, the chatbot may request additional, more specific information from the user to assist in guiding the chatbot to find the provider. The chatbot may be trained based on positive and negative responses from the user to expedite the process of supplying an appropriate answer.

Furthermore, the chatbot may access various databases with healthcare-based information. For example, upon obtaining the suitable provider from the chatbot, the user may desire information regarding health insurance coverage. As such, the user may ask the chatbot what types of insurance are accepted by the provider. The chatbot may refer to a database or stored lookup table to provide a list of accepted insurance. Alternatively, the user may query whether a specific type of insurance is considered in- or out-of-network by the provider. The chatbot may similarly refer to the database or lookup table to supply a suitable response.

In some instances, when the chatbot is addressing a query that the chatbot has not previously addressed, the chatbot may initially provide responses that do not match or are more broad than desired by the user. The user may respond with a negative answer and continue asking questions. The chatbot may use the subsequent questions to narrow a focus of the chatbot's search for a suitable answer until a positive response is received. The flow of questions and answer may be used in real-time to train the chatbot so that when a similar question is posed by user, the chatbot may determine where to find relevant information immediately.

In other examples, the VSDG, via the chatbot, may allow the user to schedule upcoming appointments with a designated health care specialist, provide troubleshooting assistance when the user experiences difficulties navigating the website, answer questions regarding information provided on the website, etc. For example, troubleshooting may include providing the user with a customer support e-mail address or telephone number when the user submits information indicating that links displayed in the website are broken or website images are not properly displayed. The chatbot may be directly linked to a customer support department and may transmit a message to the customer support department when problems with the website are indicated.

Troubleshooting may also include responding to user queries when the user is attempting to locate a specific topic within the website but is unable to find the information. The user may the chatbot with a question such as "where can I find hours of operation" and the chatbot may provide the information directly, as one example, by searching the website and identifying the relevant information, or by providing a link to a webpage with the information.

As interactions with multiple users accumulate, the chatbot may become increasingly efficient in providing useful responses. By training the chatbot to generate suitable answer to queries, the user may more directly obtain desired information rather than navigating through various pages and/or links of a website or being placed on hold when choosing to contact an institution via telephone. The VSDG thus increases an efficiency of the institution in providing information to customers and clients and enhances the chatbot's accuracy and usability.

The VSDG, comprising a VAE in combination with a GAN, may use a neural network to process input queries. In a diagram depicted in FIG. 3, a neural network 300 for dialog generation is shown. In one example, the neural network 300 is included in the computing system 100 of FIG. 1 though it should be appreciated that the neural network 300 may be implemented with other systems and components without departing from the scope of the present disclosure. As a non-limiting example, neural network 300 may be stored in a data-holding subsystem 115 and may be updated, executed, or otherwise processed via logic subsystem 110.

The neural network 300, also a multilayer perceptron (MLP), may comprise a plurality of interconnected neurons 301 (or nodes) arranged in layers. As used herein with respect to neurons 301, the term "layer" refers to a collection of simulated neurons 301 that have inputs and/or outputs connected in similar fashion to other collections of simulated neurons 301. For example, an input layer 302 may comprise multiple neurons 301, and similarly an output layer 306 and a hidden layer 304 may each comprise multiple neurons 301. The input layer 302 may be connected to the hidden layer 304 by a first set of connectors 303 and the hidden layer 304 may be connect to the output layer 306 by a second set of connectors 305. As such, data may propagate from the input layer 302, through the hidden layer 304 to the output layer 306. In one example, the neurons 301 in the hidden layer 304 receive inputs and/or activation functions from the input layer 302. These activation functions may alter an output of the neurons 301 in the hidden layer 304 to the neurons 301 in the output layer 306.

Each of the neurons 301 in the input layer 302 may be connected to more than one neuron in the hidden layer 304 and each neuron in the hidden layer 304 may be connected to more than one neuron in the output layer 306. It will be appreciated that a number of neurons 301 in an adjacent layer which one neuron is connected to may vary from the number of connections shown in FIG. 3. Furthermore, the number of neurons 301 in each layer and a number of layers in each type of layer may vary from that shown in the non-limiting example of FIG. 3

In one example, the neural network 300 may be a feed-forward neural network. In some examples, the neural network 300 may learn through back-propagation. To minimize total error, gradient descent may be used to adjust each weight in proportion to the derivative of the error with respect to that weight, provided the non-linear activation functions are differentiable. Also, global optimization methods may be used to train the weights of the neural network 300.

To generate dialog in response to input queries, queries may be input to the neural network 300 which results in a yield of a plurality of outputs. More specifically, input layer 302 receives input which is relayed to the hidden layer 304. Each neuron of the input layer 302 is connected to each neuron of the hidden layer 304. The neurons of the hidden layer 304 receive one or more inputs and sums them to produce an output. The sums of each neuron are weighted and the sums are passed through a non-linear activation function. The output is passed on to each neuron of the output layer 306.

It should be understood that each neuron of the neural network 300 may transmit a same input to multiple output connections. In one embodiment the neurons of the neural network It should be appreciated that, for simplicity, FIG. 3 depicts a small number of neurons in each layer and that in practice, the neural network 300 may include many thousands of neurons. Moreover, the neural network 300 is shown with one hidden layer but may include dozens or more hidden layers and may be adjusted, for example, to an optimal number based on the number of neurons in the output layer 306. As an example, the output generated at the output layer 306 may be a word adapted to be concatenate to input queries, delivered to the input layer 302 as paraphrases. A complete sentence may be generated as an output by iteratively consuming the neural network 300 for next-word suggestions. The initial input to the input layer 302 may also be a specific state or word that is pre-defined.

As another example, the output may be a series of sentences rather than a single sentence, the series of sentences linked to one another by a common word or phrase as an input. Each associated sentence may be iteratively used as subsequent inputs, with the outputs linking the sentences to one another. The series of sentences may be linked in a manner that simulates conversation via iterative experiences that result in associated generation of the individual sentences. Furthermore, the output may be generated as list of relevant actions to instruct suitable successive steps in response to the input.

Neural network solutions may be applied to the task of dialog generation. In particular, deep neural networks, powerful machine learning models, are often using for difficult problems such as speech recognition and visual object recognition and thus may be effective models for dialog generation. Typical deep neural network dialog generators apply an encoder-decoder structure where the encoder abstracts the query, e.g., a sentence, into an embedding and the decoder recursively generates word embeddings from the encoded sentence embedding. However, the query may be seen as a sequence of words representing the question to be mapped to a sequence of words representing an answer. Sequences often pose difficulties for deep neural networks because deep neural networks are most effective for problems where the dimensionality of the inputs and outputs are known and fixed. Thus, a sequence-to-sequence (Seq2Seq) model may be used due to the greater flexibility and higher-quality responses achieved by this approach over rule and grammar-based methods traditionally used by neural network systems.

The Seq2Seq model encodes the input sequence to a vector of a fixed dimensionality and then decodes the target sequence from the vector. However, using pure encoder-decoder models may not be sufficiently sensitive to input changes. The VAE, with encoder receiving input queries and a decoder with variational layers, may produce responses that may be trained by the GAN to become more grammatically and syntactically similar to conventional diction in a Variational-Seq2Seq Dialog Generator (VSDG). A framework architecture 401 of the resulting VSDG is shown in FIG. 4.

The framework 401 of the VSDG 400 comprises an initial testing process 402 that includes training processes (indicated by arrows), followed by additional training steps. The testing process 402 begins with the entry of queries (seed questions) into the VAE encoder 404 after basic processing of the queries such as standardizing cases, word embedding lookup, sentence padding, etc. The most important feature of the VAE is a variational layer that is trained by KL-Divergence loss to unit-Gaussian vectors. The trained variational layer attempts to regularize the embeddings abstracted by the encoder to be closer to unit-Gaussian distribution. It is known that regularizing embedding vectors to unit-Gaussian distribution improves performance of the VAE in image classification tasks, due to a higher load of information, and thus may have a similar effect when applied to dialog generation.

The VAE is a development in unsupervised machine learning that combines probabilistic Bayesian inference with deep learning. Assumptions of the VAE are weak and training is fast via backpropagation. Although first adapted for image processing, the VAE has also been applied towards some NLP tasks and has shown that the regularized vector representation summarized by the VAE encoder carries more information than those generated by traditional autoencoders. Regularization is incorporated by explicitly learning the joint distribution over data and a set of latent variables that is most compatible with observed data points and some designated prior distribution over latent space. The prior distribution informs the model by shaping the corresponding posterior, conditioned based on a given observation, into a regularized distribution over latent space (e.g., the coordinate system spanned by the hidden representation).

The VAE may include two parts: an encoder 404 and a decoder 406 adapted with at least one neural network (NN) dense layer. The VAE encoder 404 receives an input and may provide a low dimensional output. The output of the encoder 404 is processed by the at least one NN dense layer and reconstructed by the decoder 406 to have a same set of dimensions as the input. The model may be optimized with reconstruction error between the input and the output, e.g., squared error or cross entropy, and in probability model terms, the VAE may refer to approximate inference in a latent Gaussian model where the approximate posterior is optimized.

While adding a variational layer (e.g., the VAE) to the Seq2Seq model may result in response sentences with appropriate structure to be comprehensive, undesirable noise elements may remain. Noise elements may comprise word embedding vectors that differ from word vectors in the language model to an extent that the vectors may not be resolved to any existing word. Experiments have indicated that images generated by VAE are often more blurry than those generated by GAB, suggesting that the incorporation of GAN into the model may refine the response wording.

Returning to the testing process 402 of the framework 401 of the VSDG 400, queries that are processed by the VAE encoder 404 are summarized into embedding vectors that represent the queries (question embedding). The query embeddings are passed through the NN (neural network) Dense Layer to the decoder 406 to yield response (answer) embeddings. The response embeddings are fed to a GAN generator 408 (GAN-G).

GAN is a generative model for unsupervised learning that is trained via an adversarial process consisting of two models that are trained in competition with one another: a generator G that captures the data distribution and a discriminator D that determines whether its input is received from the training data or from the generator G. The model takes a training set, consisting of samples drawn from a distribution and learns to represent an estimate of the distribution. The result is a probability distribution which may be estimated explicitly or the model may generate samples from the probability distribution. The training procedure of G maximizes the probability that the output generated by G will lead D to make a mistake. Analogous to a minimax two-player game, in the space of arbitrary functions G and D, a unique solution exists with G recovering the training data distribution and D equal to ½ everywhere. In most cases where G and D are defined by multilayer perceptrons (e.g., neural networks), the system may be trained with two backpropagation processes. The system does not use of Markov chains or unrolled approximate inference networks during either training or generation of samples.

For example, the generative model may be analogous to a team of counterfeiters, attempting to produce fake currency and use the fake currency without detection while the discriminative model may be analogous to the police, working to detect the fake currency. The two teams compete to improve their methods until the counterfeit is indistinguishable from the real currency. Both the generative and discriminative models may be trained using backpropagation and dropout algorithms and sample from the generative model using exclusively forward propagation.

The generated answers provided by the GAN-G 408 is the final component of the testing process 402. The framework 401 of the VSDG 400 continues training steps including seeding a GAN discriminator (GAN-D) 410 with answers that are representative of expected responses from humans. Loss calculation 412 is based on a loss function that separates responses from the GAN-G from real samples. The loss function captures a difference between anticipated answers and generated answers produced by the GAN-G. The loss calculation is used to update the GAN-G to reduce calculated error between the generated output and the seed response.

Performance of a combinatorial network structure, comprising the VAE and GAN, on dialog generation may be tested using Bilingual Evaluation Understudy (BLEU) and Recall-Oriented Understudy for Gisting Evaluation (ROUGE) evaluation metrics. BLEU is an algorithm for evaluating a quality of text that has been machine-translated. Similarity of the machine-translation to human translation is scored based on a value between 0 and 1, with 1 being indeterminable from human translation. ROUGE is a set of metrics and software for evaluating automatic summarization and machine-translation software in natural language processing. Automatically produced summaries or translations are compared with a human-generated reference summary/translation or with a set of reference summaries/translations. Results of ROUGE are also scored as a value between 0 and 1, with 1 being indistinguishable from the reference or set of references. Experiments analyzing results from different combinations of neural network architectures may be compared by fixing parameters such as learning rate, training epochs, and configurations of a convolutional neural network (CNN) and a recurrent neural network (RNN). Evaluation scores for three different neural network architectures are shown in a Table 500 at FIG. 5.

Table 500 includes a first column 502 listing the type of neural network system architecture, a second column 504 listing BLEU scores, and a third column 506 listing ROUGE scores. The three systems shown in the first column 502 are different combinations of neural network configurations of the VAE. The CNN is a class of deep, feed-forward neural networks comprising input and outer layers as well as multiple hidden layers. The RNN is a class of neural network exhibiting dynamic temporal behavior due to formation of a directed cycle by connections between neurons. The RNN is rule-based while the CNN may comprise a number of layers and act as a neuron network dense layer, e.g., the NN Dense Layer of the decoder 406 of FIG. 4. The first system in the first column 506, RNN-2-layer-CNN, uses the RNN as the encoder and the CNN as the decoder with two hidden layers. The second system, CNN-2-layer-CNN, uses the CNN as the encoder and also as the decoder with two hidden layers. The third system, CNN-3-layer-CNN, uses the CNN as the encoder and the CNN also as the decoder with three hidden layers. The framework architecture of the systems includes pairing the VAE with the GAN, with reference to FIG. 4.

The data evaluated is from the frames dataset of Microsoft Maluuba, including 38042 sentences in the corpus, and a 60%/20%/20% split was applied over the dataset. The dialogs are mainly daily greetings and ticket-booking conversations and examples of such queries are shown in Table 600 of FIG. 6. The language model used is trained on a combination of a twitter text8 dataset and a portion of the Maluuba training set. The word embeddings are 50-dimension vectors and scores are based on models trained over 3000 iterations with a learning rate of 0.001. BLEU and ROUGE scores represent similarity of the candidate text to a reference text with numbers closer to 1 indicating greater similarity.

Results from evaluation of the three systems tested show that the CNN encoder performs better than the RNN encoder, according to both BLEU and ROUGE. With the CNN as the encoder, the 3 layer CNN decoder has higher scores than the 2 layer CNN decoder. The results of the BLEU and ROUGE evaluations indicate that the CNN encoder is more appropriate for dialog generation than the RNN and that deeper CNN decoders (e.g., more layers) perform better than shallower CNN decoders (e.g., less layers).

Figure 5:
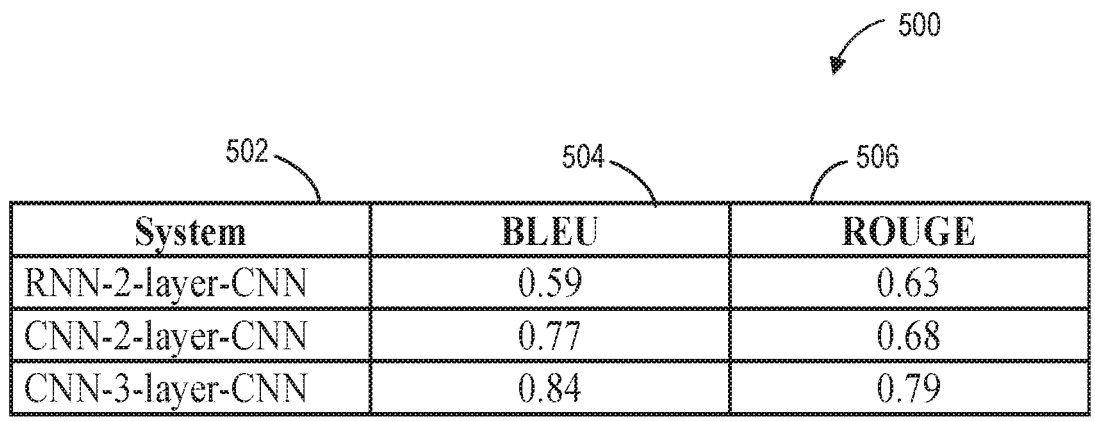
FIG. 5 is a table showing evaluation scores for different neural network combinations of a dialog generator.
Figure 6:
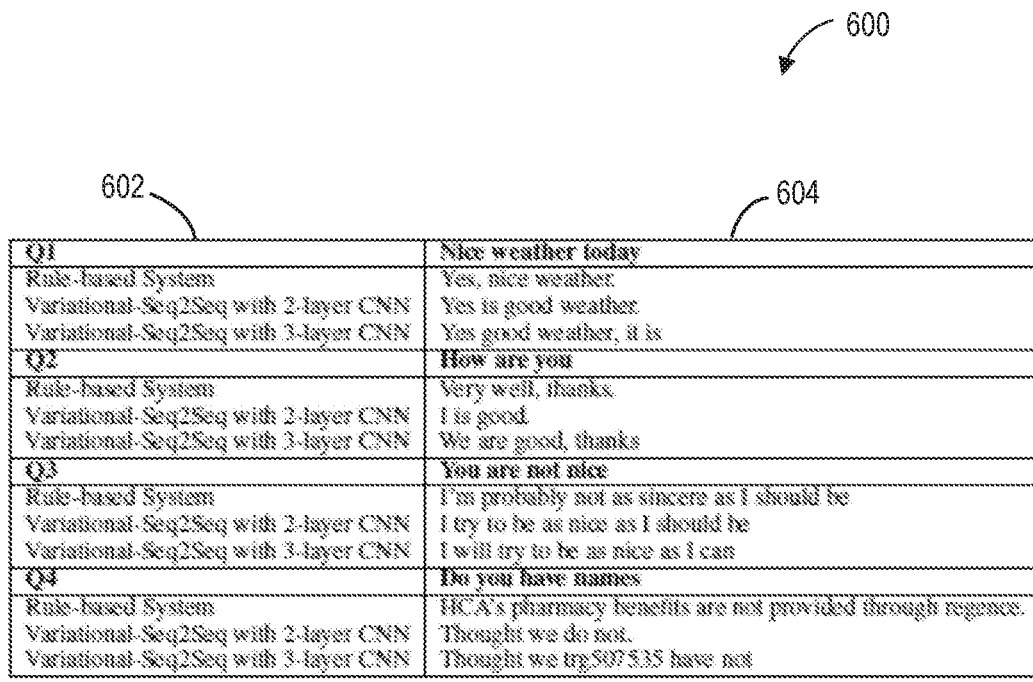
FIG. 6 is a table showing example responses from inputting queries into different neural network combinations of a dialog generator.

Examples of queries and generated responses from the CNN-2-layer-CNN and the CNN-3-layer-CNN variations of the VAE of Table 500 of FIG. 5 are shown in Table 600 at FIG. 6 and compared to results from a traditional rule-based system. The generated responses shown in Table 6 may be unrefined responses that may be used to further train the VSDG, e.g., the responses shown may not be directly displayed in a chatbot but instead used to seed improved answers that resemble natural dialog more closely. Table 600 includes a first column 602 listing the type of dialog generator, comprising the rule-based system and the two VAE combinations of Table 500 with the CNN decoders, corresponding to questions and respective answers from each dialog generator provided in a second column 604.

For queries that are very similar to existing queries in the data base (e.g., Q1, Q2), while the rule-based system generates answers that are syntactically and semantically correct, the responses from the VSDG generator are more appropriate in meaning and as well as grammatically acceptable. The VSDG systems (e.g., VAE and GAN combined) consistently score higher than the rule-based system for queries that do not exist in the training corpus (e.g., Q3, Q4). Furthermore, the deeper VSDG decoder (3 layers) generally provides better responses than the shallower VSDG decoder (2 layers). The answer to Q4 generated by the deeper VSDG decoder (3 layers) includes a code "trg507535" which may be a training code for a name, indicating that the VSDG recognizes that Q4 refers to names but produces an incorrect answer. As a training data scale for the VSDG increases, the VSDG may generate less errors and more suitable responses.

Figure 7:
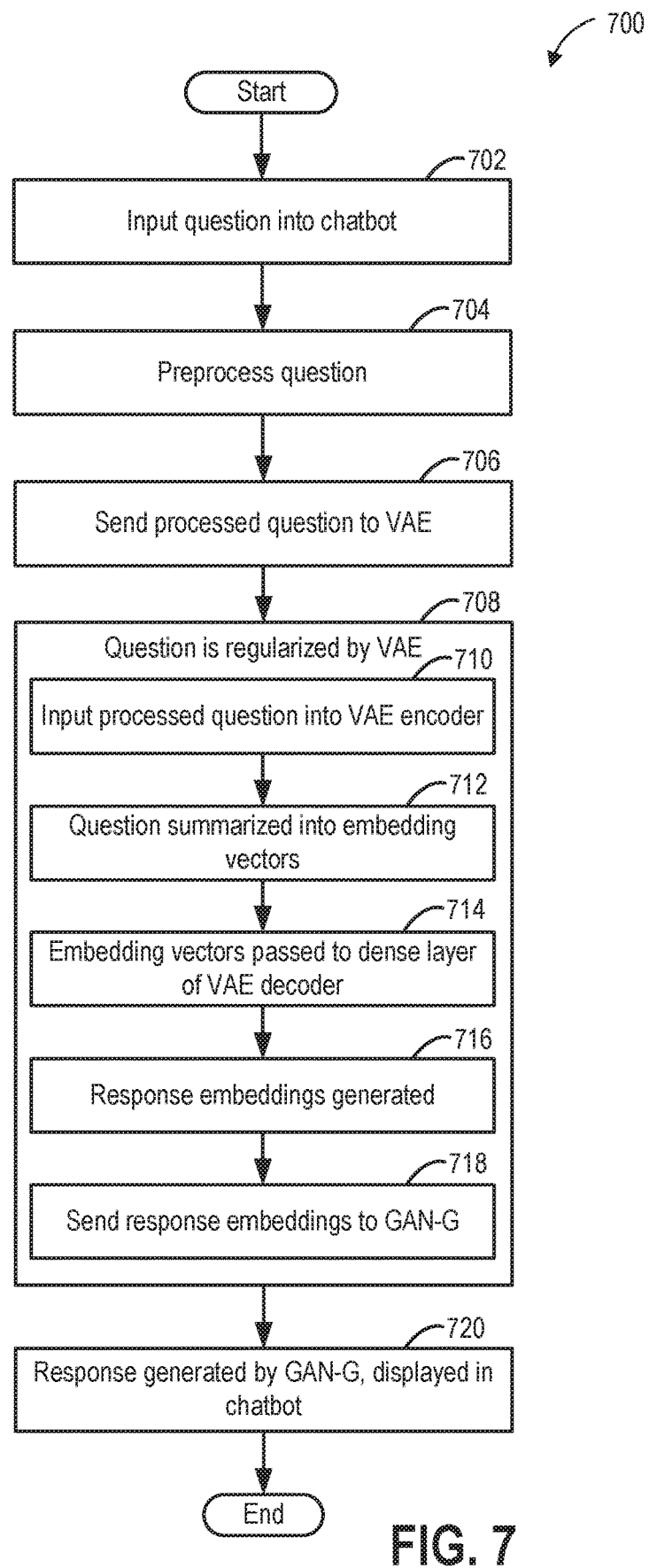
FIG. 7 shows a high-level flowchart illustrating an example method of a testing process of a dialog generator to generate answers to queries.

FIG. 7 shows a high-level flow chart illustrating an example method 700 for a testing process of a Variational-Seq2Seq dialog generator (VSDG) comprising a variational autoencoder (VAE) in combination with a generative adversarial network (GAN) for dialog generation in response to input queries. Method 700 may be carried out, as a non-limiting example, by a computing system such as the computing system described herein with regard to FIG. 1, though it should be understood that the method may be carried out by other systems without departing from the scope of the current disclosure.

Method 700 begins at 702 where a question, such as the questions shown in column 604 of FIG. 6, is entered into a chatbot configured with the VSDG and displayed on a computer system. For example, a user may navigate to a website of a clinic or organization and open a customer support page. Entering the question may include typing the query into a user interface of a chatbot, such as the textbox 202 of FIG. 2 or, if voice recognition software is used, speaking the question into a microphone connected to the computer. At 704, the method includes preprocessing of the question by the computer which may include case standardization, looking up word embedding in a database, and sentence padding. The processed question is sent to the VAE at 706.

At 708, the VAE converts the question into an embedding using variational layers which regularizes the question. For example, the regularization of a query may include modification of query embeddings towards unit-Gaussian distribution. Conversion of the question to an embedding may include, for example, directing the processed question to the VAE encoder at 710 where the question is abstracted, producing low dimensional output as described for the encoder 404 of FIG. 4, and summarized into embedding vectors at 712. Abstraction of the question may be an initial step in a testing process of the DSDG. Summarizing the embedding vectors allows the embedding vectors to be decoded into outputs that are relevant to the original question. At 714 of the method, the embedding vectors are passed to one or more neural network dense layers of the VAE decoder. The dense layer may be one or more hidden layers of a neural network, such as the hidden layers 304 of neural network 300 of FIG. 3. The decoder produces reconstructed outputs, or word embeddings, at 716 based on the received embedding vectors with the same dimension as the input embedding vectors. At 718, the response embeddings are sent to a generator of the GAN (GAN-G).

The combination of inputting the processed question into the VAE encoder at 710 and passing the embedding vectors to the dense layer of the VAE decoder at 714 enables the VSDG to provide increasingly natural and human-like responses to input queries. Unlike conventional dialog generators, the conversion of the question into vectors allows processing of the question through the neural network of the VAE. As a result, the VSDG may leverage the training capability of the GAN to update the VAE through backpropagation, thereby enhancing an ability of the VSDG to continually modify responses to queries over time. Thus the VSDG may be actively and incrementally updated by chatbot usage, increasing an efficiency of the VSDG towards providing useful responses to input queries.

At 720 of the method, which is also a first step in a method for training the VSDG, the method includes the GAN-G generating a response to the received response embeddings. The chosen response is determined from a probability distribution of data. For example, the VSDG may form answers to questions, such as the answers shown in column 604 of FIG. 6. The answer to the question is displayed on a computer screen by the chatbot for the user to observe. The user may then accept the answer, if deemed suitable, or may continue entering queries.

Figure 8:
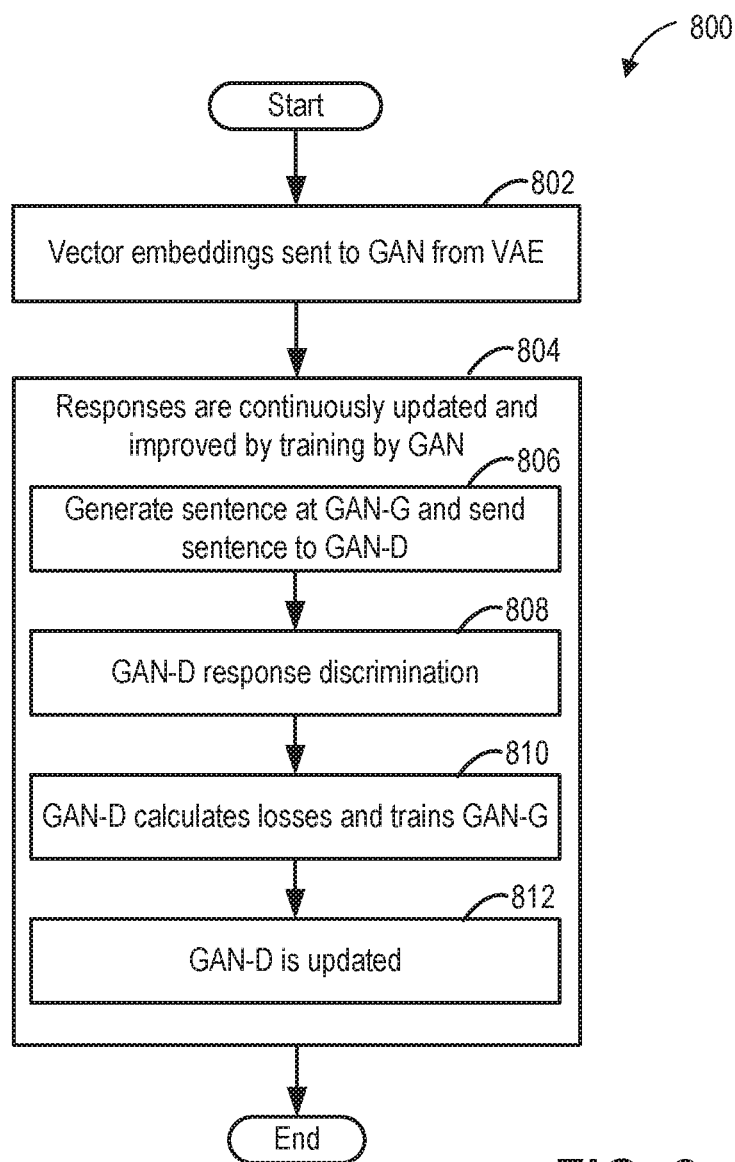
FIG. 8 shows a high-level flowchart illustrating an example method of a training process of a dialog generator to improve responses to queries.

The response generated by the GAN-G may be trained by the GAN through an adversarial process where the GAN-G and a discriminator of the GAN (GAN-D) are simultaneously trained. FIG. 8 shows a high-level flow chart illustrating an example method 800 for a training process of a VSDG comprising a GAN for training the VSDG to generate more natural and appropriate responses to queries. Method 800 may be carried out, as a non-limiting example, by a computing system in combination with a VAE in a VSDG, such as the computing system described herein with regard to FIG. 1 and the method 700 of FIG. 7, though it should be understood that the method may be carried out by other systems without departing from the scope of the current disclosure.

At 802 of the method 800, the method includes sending the vector embedding produced by a VAE decoder to the GAN, as shown in the framework 400 of the VSDG 400 of FIG. 4 and at 720 of method 700 of FIG. 7. The responses generated by the GAN-G are continually updated and improved, e.g. reducing the difference between the generated response and seed responses from a training data set, at 804. Training at the GAN includes, at 806, generating the targeted response sentence at the GAN-G and passing the sentence to the GAN-D. At 808, the method includes discriminating between the generated response and an anticipated response. Loss calculations determined from a loss function, based on mistakes made by the GAN-D, are performed at 810 and used to train the GAN-G to produce answers that reduce differences between generated responses and seed responses. At 812, the GAN-D structures are updated based on the loss calculations. Thus, both the GAN-G and the GAN-D are simultaneously updated based on results from the loss function and trained by question-answer pairs in addition to the user's responses. Then the GAN-D is updated, the VAE is also updated via backpropagation. In some examples, the GAN-G does not provide feedback to the VAE to affect the embedding vectors.

In this way, a chatbot may generate appropriate, meaning, and engaging responses to input queries posed by clients to a user interface by using a frame architecture that comprises a variational autoencoder (VAE) and generative adversarial network (GAN). The VAE embeds word semantics into vector representations from a large-scale dataset to model input queries towards suitable responses and the GAN improves the responses to become more natural and human-like. In contrast to conventional dialog generators where responses are not continuously updated, inputting regularized queries to the VAE to be summarized into embedding vectors and delivering the vectors to a dense neural layer of a VAE decoder to be generated as response embeddings allows the GAN to be trained and updated, thereby updating the VAE as well. With the rapid proliferation of artificial-intelligence solutions aligned with advances in natural language processing and machine learning technologies, chatbot systems have become increasingly popular and widely utilized. Such systems are more complex than applications such as voice search or voice messaging and development of deep learning-based solutions to dialog generation may allow natural responses to spontaneous ungrammatical utterances to be formed.

To further advance the capabilities of the Variational-Seq2Seq dialog generator (VSDG), word embeddings may be refined. For example, noisy words may be cut off during training of a Neural Network Language Model, thus providing more accurate word embeddings. Also, a larger, higher-quality corpus may be used to train the system and evaluate performance. Furthermore, additional model settings inside the framework of VSDG, such as incorporating a deeper convolutional neural network, may boost the performance of the VSDG.

It will be appreciated that the configurations and routines disclosed herein are exemplary in nature, and that these specific embodiments are not to be considered in a limiting sense, because numerous variations are possible. For example, different numbers of neural network layers or different types of neural network configurations from those shown in FIGS. 3 and 5 may be used in a VAE. The subject matter of the present disclosure includes all novel and non-obvious combinations and sub-combinations of the various systems and configurations, and other features, functions, and/or properties disclosed herein.

In one embodiment, a method includes entering an input query into a user interface receiving an input query by a variational autoencoder (VAE), embedding the input query into vector representations via the VAE, converting the vector representations into responses by a generative adversarial network (GAN), updating the GAN by a training process, and displaying a response to the input query in a user interface based on the conversion provided by the GAN. In a first example of the method, with an encoder of the VAE encoder, an embedding vector is created from the input query and, with a decoder of the VAE, a response embedding is created from the embedding vector. A second example of the method optionally includes the first example, and further includes, wherein converting the vector representations into responses by the GAN includes sending the response embedding from the VAE to the GAN. A third example of the method optionally includes one or more of the first and second example, and further includes receiving, at a generator of the GAN (GAN-G), the response embedding from the decoder, and generating, with the GAN-G, a response sentence to the input query. A fourth example of the method optionally includes one or more of the first through third examples, and further includes passing the response embedding received by the GAN-G from the decoder to a discriminator of the GAN (GAN-D), and receiving, at the GAN-D, data from a training data set including a seed answer to the input query. A fifth example of the method optionally includes one or more of the first through fourth examples, and further includes determining, with the GAN-D, if the received data originates from the GAN-D or the training data set, and calculating, with the GAN-D, losses based on a result of the determination. A sixth example of the method optionally includes one or more of the first through fifth examples, and further includes training the GAN-G by the GAN-D to generate more suitable responses based on the calculated losses. A seventh example of the method optionally includes one or more of the first through sixth examples, and further includes self-updating the GAN-D based on the calculated losses. An eighth example of the method optionally includes one or more of the first through seventh examples, and further includes, wherein training the artificial intelligence natural language processing system includes updating the artificial intelligence natural language processing system based on question-answer pairs and user's responses. A ninth example of the method optionally includes one or more of the first through eighth examples, and further includes, wherein training the artificial intelligence natural language processing system includes using a loss function to update the artificial intelligence natural language processing system.

In another embodiment, a system includes a user interface device, and a processor communicatively coupled to the user interface device, the processor configured with a variational autoencoder (VAE) combined with a generative adversarial network (GAN) stored in non-transitory memory, the processor further configured with instructions stored in the non-transitory memory that, when executed, cause the processor to accept input queries from a user interface, calculate, using the VAE and GAN, responses to the queries, and output the responses by displaying the responses in the user interface. In a first example of the system, the VAE includes at least one neural network dense layer. A second example of the system optionally includes the first example and further includes, wherein an encoder of the VAE is a recurrent neural network. A third example of the system optionally includes one or more of the first and second examples, and further includes, wherein an encoder of the VAE is a convolutional neural network. A fourth example of the system optionally includes one or more of the first through third examples, and further includes, wherein a decoder of the VAE is a convolutional neural network. A fifth example of the system optionally includes one or more of the first through fourth examples, and further includes, wherein the GAN includes a generator that generates responses and a discriminator that discriminates between generated responses and anticipated responses.

In yet another embodiment, a method includes training a dialog generator of the chatbot by a combination of a variation autoencoder (VAE) coupled to a generative adversarial network (GAN), updating a discriminator of the GAN based on competition between a generator of the GAN and the discriminator of the GAN, updating the VAE by backpropagation based on updating of the discriminator of the GAN, and displaying a response provided by the updated VAE and the updated GAN. In a first example of the method, training the dialog generator includes embedding an input query at the VAE as vectors, generating response embeddings from the vectors, and sending the response embeddings to the generator of the GAN to create a sentence based on the response embeddings, the created sentence evaluated against seeded answers at the discriminator of the GAN. A second example of the method optionally includes the first example, and further includes, wherein updating the discriminator of the GAN includes performing a loss calculation, using the loss calculation to adjust the discriminator to reduce the loss calculation, and updating the discriminator and the VAE through backpropagation. A third example of the method optionally includes one or more of the first and second examples, and further includes, wherein displaying the response includes presenting an updated answer generated by the VAE and GAN in an output textbox shown at a display device.

The following claims particularly point out certain combinations and sub-combinations regarded as novel and non-obvious. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application.

Such claims, whether broader, narrower, equal, or different in scope to the original claims, are also regarded as included within the subject matter of the present disclosure.

The invention claimed is:

1. A method for training an artificial intelligence natural language processing system, comprising:
   entering an input query into a user interface;
   receiving an input query by a variational autoencoder (VAE);
   embedding the input query into vector representations via the VAE;
   converting the vector representations into responses by a generative adversarial network (GAN);
   updating the GAN by a training process; and
   displaying a response to the input query in a user interface based on the conversion provided by the GAN.

2. The method of claim 1, further comprising creating, with an encoder of the VAE encoder, an embedding vector from the input query, and creating, with a decoder of the VAE, a response embedding from the embedding vector.

3. The method of claim 2, wherein converting the vector representations into responses by the GAN includes sending the response embedding from the VAE to the GAN.

4. The method of claim 3, further comprising receiving, at a generator of the GAN (GAN-G), the response embedding from the decoder, and generating, with the GAN-G, a response sentence to the input query.

5. The method of claim 4, further comprising passing the response embedding received by the GAN-G from the decoder to a discriminator of the GAN (GAN-D), and receiving, at the GAN-D, data from a training data set including a seed answer to the input query.

6. The method of claim 5, further comprising determining, with the GAN-D, if the received data originates from the GAN-D or the training data set, and calculating, with the GAN-D, losses based on a result of the determination.

7. The method of claim 6, further comprising training the GAN-G by the GAN-D to generate more suitable responses based on the calculated losses.

8. The method of claim 7, further comprising self-updating the GAN-D based on the calculated losses.

9. The method of claim 1, wherein training the artificial intelligence natural language processing system includes updating the artificial intelligence natural language processing system based on question-answer pairs and user's responses.

10. The method of claim 1, wherein training the artificial intelligence natural language processing system includes using a loss function to update the artificial intelligence natural language processing system.

11. A system for an artificial intelligence dialog generator, comprising;
    a user interface device; and
    a processor communicatively coupled to the user interface device, the processor configured with a variational autoencoder (VAE) combined with a generative adversarial network (GAN) stored in non-transitory memory, the processor further configured with instructions stored in the non-transitory memory that, when executed, cause the processor to:
    accept input queries from a user interface;
    calculate, using the VAE and GAN, responses to the queries; and
    output the responses by displaying the responses in the user interface.

12. The system of claim 11, wherein the VAE includes at least one neural network dense layer.

13. The system of claim 12, wherein an encoder of the VAE is a recurrent neural network.

14. The system of claim 12, wherein an encoder of the VAE is a convolutional neural network.

15. The system of claim 12, wherein a decoder of the VAE is a convolutional neural network.

16. The system of claim 11, wherein the GAN includes a generator that generates responses and a discriminator that discriminates between generated responses and anticipated responses.

17. A method for providing continually updating chatbot responses comprising;
    training a dialog generator of the chatbot by a combination of a variation autoencoder (VAE) coupled to a generative adversarial network (GAN);
    updating a discriminator of the GAN based on competition between a generator of the GAN and the discriminator of the GAN;
    updating the VAE by backpropagation based on updating of the discriminator of the GAN; and
    displaying a response provided by the updated VAE and the updated GAN.

18. The method of claim 17, wherein training the dialog generator includes embedding an input query at the VAE as vectors, generating response embeddings from the vectors, and sending the response embeddings to the generator of the GAN to create a sentence based on the response embeddings, the created sentence evaluated against seeded answers at the discriminator of the GAN.

19. The method of claim 17, wherein updating the discriminator of the GAN includes performing a loss calculation, using the loss calculation to adjust the discriminator to reduce the loss calculation, and updating the discriminator and the VAE through backpropagation.

20. The method of claim 17, wherein displaying the response includes presenting an updated answer generated by the VAE and GAN in an output textbox shown at a display device.

* * * * *